United States Patent [19]

Cunningham

[11] 4,178,497

[45] Dec. 11, 1979

[54] END SEALS FOR ELECTRIC IMMERSION HEATING ELEMENTS

[75] Inventor: Donald M. Cunningham, Pittsburgh, Pa.

[73] Assignee: Emerson Electric Co., St. Louis, Mo.

[21] Appl. No.: 805,594

[22] Filed: Jun. 10, 1977

[51] Int. Cl.[2] .......... H05B 3/82; H01C 1/03; H02G 15/04

[52] U.S. Cl. .......... 219/336; 29/611; 174/77 R; 219/534; 219/541; 219/544; 338/238; 338/274

[58] Field of Search .......... 29/611, 613-619, 29/621; 174/77 R; 338/273-276, 228, 238-243; 219/316, 318, 335, 336, 338, 534, 541, 544

[56] References Cited

U.S. PATENT DOCUMENTS

| | | | |
|---|---|---|---|
| 965,684 | 7/1910 | Bierce et al. | 174/77 R |
| 2,043,195 | 6/1936 | Finlayson | 338/228 X |
| 2,269,194 | 1/1942 | Finlayson | 338/274 X |
| 2,703,834 | 3/1955 | Charbonneau | 338/238 X |
| 2,831,951 | 4/1958 | Desloge | 338/241 |
| 3,310,769 | 3/1967 | Simmons | 338/274 X |
| 3,582,616 | 6/1971 | Wrob | 338/274 X |
| 3,617,614 | 11/1971 | Henry | 174/77 R |
| 3,934,116 | 1/1976 | Cunningham et al. | 219/336 |

FOREIGN PATENT DOCUMENTS

| | | | |
|---|---|---|---|
| 2162362 | 6/1973 | Fed. Rep. of Germany | 338/274 |

*Primary Examiner*—A. Bartis
*Attorney, Agent, or Firm*—Michael Williams

[57] ABSTRACT

A terminal end seal for a metal-sheathed electric immersion water heating element of a water heating tank includes a plastic sealing plug disposed within a pocket at the end of the sheath in surrounding relationship to the terminal pin and locked in sealing engagement with the sheath by inward deformation of the sheath. An electrically insulative vulcanized fibre washer is disposed in the pocket inwardly of the plug in engagement with the terminal pin and inner surface of the sheath. Without the fibre washer, it would be possible under abnormal conditions for the plastic sealing plug to fail and the sheath portion immersed within the water in the tank to fracture, allowing water to enter the sheath and flow outwardly of the then-open sheath end to cause damage. However, the fibre washer intercepts such water and swells to form a tight seal to restrict flow of water outwardly of the sheath. The inward deformation of the sheath provides a stop to restrict movement of the fibre washer outwardly of the sheath in the event that high water pressure causes the washer to move in the latter direction.

7 Claims, 4 Drawing Figures

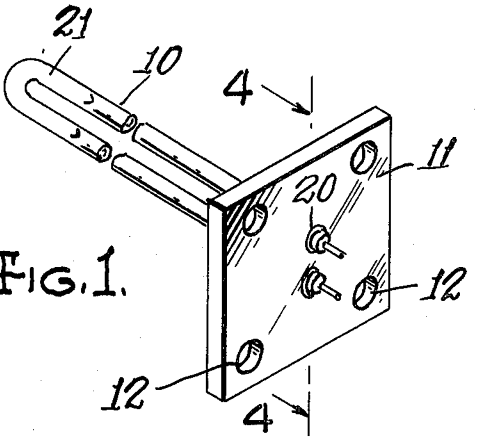
FIG. 1.
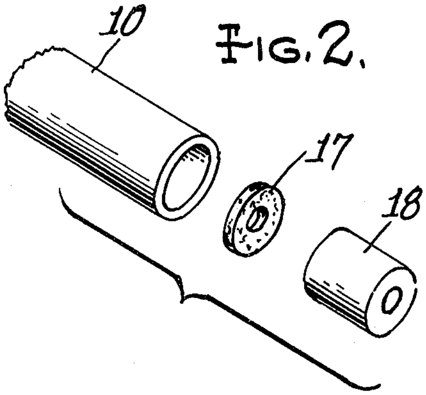
FIG. 2.
FIG. 3.
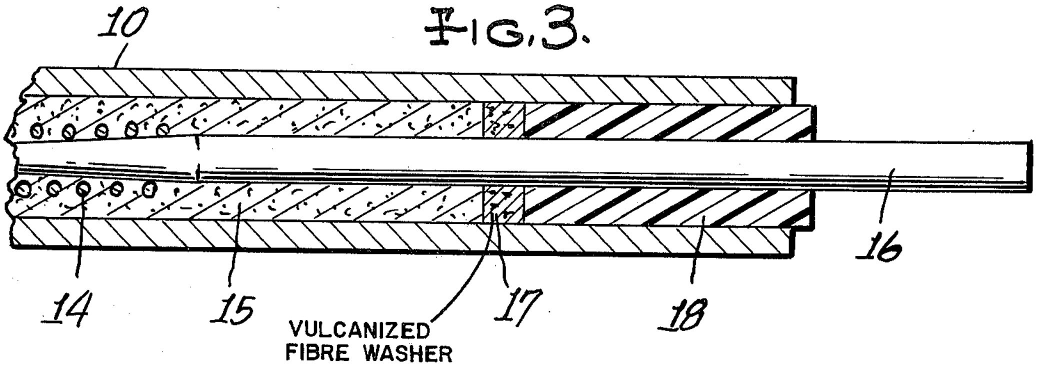
FIG. 4.
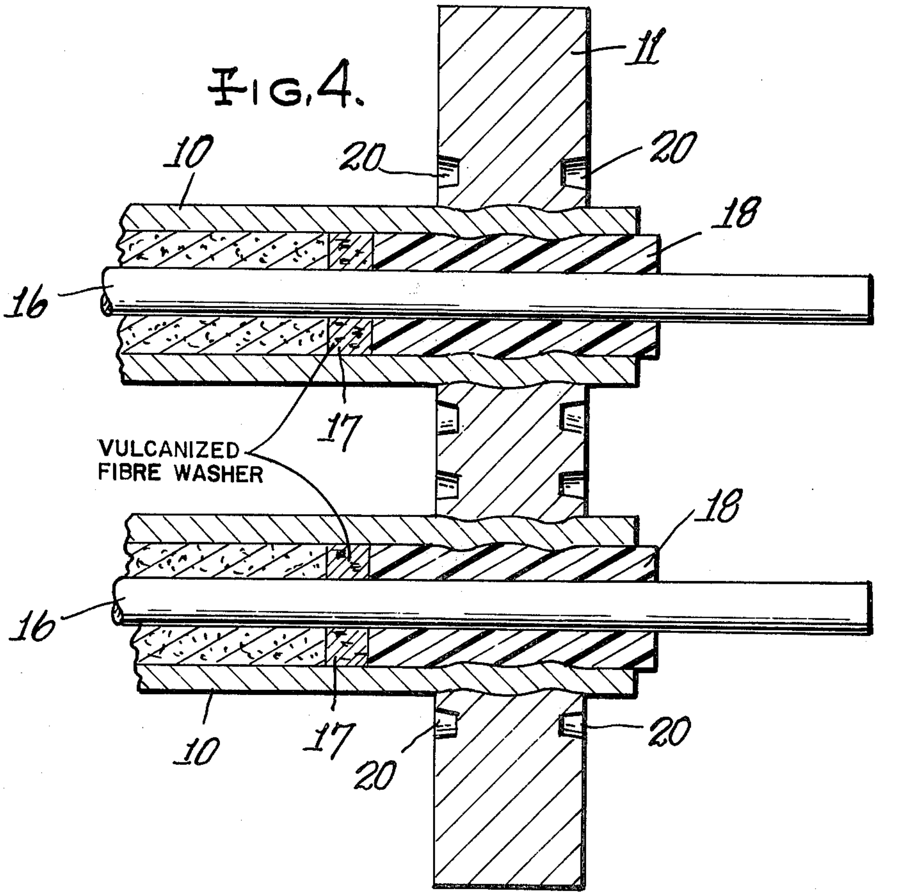

END SEALS FOR ELECTRIC IMMERSION HEATING ELEMENTS

BACKGROUND AND SUMMARY

The invention relates particularly to electric heating elements comprising a tubular metal sheath, a resistance conductor within the sheath and connected to one end of a metal terminal pin, the other end of which extends outwardly of the open end of the sheath, compacted refractory material electrically insulating the resistance conductor and terminal pin from the sheath while being adapted to conduct heat from the resistance conductor to the sheath. Heating elements of this type are well known in the art and an example is found in U.S. Pat. No. 3 134 889, issued to L. D. Drugmand. End seals of various types have heretofore been provided in prior art heating elements, and the Drugmand patent discloses use of a plastic bushing.

In a prior U.S. Pat. No. (3 859 721) issued to me and Ralph Santora, a rubber bushing is used as the end seal and, although elastomeric bushings of this type proved satisfactory, their cost and the cost of assembling them as end seals was relatively expensive. In the highly competitive manufacture of electric heating elements, by high production methods, a savings of very little amount in cost often represents sales success, and efforts have been made to retain the benefits of an elastomeric end seal bushing but at reduced costs.

I have found, and commercial tests have proven, that a plastic bushing backed up by a fibre washer provides a high quality end seal for a sheathed electric heater at a cost below that of an elastomeric bushing and just slightly higher than the cost of a plastic bushing used alone. The heating element is adapted for water-heating purposes and the fibre washer is a protective element. Sometimes the water heating element is overloaded, or fails for some other reason, and this results in a buildup of heat which may melt the plastic bushing and may also cause fracture in that part of the sheath within the water. In such case, water under pressure will enter the sheath, but the fibre washer will absorb water and swell to form an even tighter seal to thereby restrict flow of water outwardly of the terminal end of the sheath.

Of the prior art presently known to me, only U.S. Pat. No. 2 703 834, issued to A. P. Charonneau, utilizes a fibre washer in the end portion of a tubular electric heater. In this patent, a pair of spaced fibre washers are used, but not for sealing purposes.

DESCRIPTION OF THE DRAWING

In the drawing accompanying this specification and forming a part of this application, there is shown, for purpose of illustration, an embodiment which my invention may assume, and in this drawing:

FIG. 1 is a broken, small scale perspective view of a water heater embodying my invention, FIG. 2 is an enlarged fragmentary, separated perspective view showing various parts utilized in my invention, FIG. 3 is an enlarged fragmentary section view of one end of a tubular electric heater embodying my invention, and FIG. 4 is an enlarged fragmentary sectional view corresponding to the line 4—4 of FIG. 1.

DESCRIPTION OF THE PREFERRED EMBODIMENT

My invention is applicable to any type of sheathed electric heating element and particularly wherein the sheath is immersed in a liquid, or at least is disposed within a moist atmosphere.

A form in which my invention has great utility is in a water heater, such as the type shown in FIG. 1, wherein the sheath 10 is of hairpin formation and adapted to be immersed in water contained in a tank (not shown). The two ends of the sheath extend through openings in a metal mounting flange 11 (or plug) and the latter has openings 12 to pass bolts (not shown) for securing the flange to the wall of the tank in a manner well known in the art.

My invention is best shown in FIGS. 3 and 4 and reference is particularly made thereto. In the usual manufacture of a tubular electric heating element, a resistance conductor 14 and granular refractory material 15 are disposed within the sheath 10 while the latter is in rectilinear form. A metal terminal pin 16 has an inner end mechanically and electrically connected to an end of the conductor 14, which is usually in the form of a helical coil.

In accordance with my invention, a washer 17 and bushing 18 are slipped over the outer end of the terminal pin and seated within the end of the sheath in abutment with each other and with the washer in abutment with the adjoining end of the refractory material. The washer 17 is formed of a material which has good electrical arc resistance; good frictional wearing qualities and oil resistance; and absorbs water. A fibrous material has been found suitable for the purpose, and vulcanized fibre washers sold by Penn Fibre and Specialty Company could be used with success. The bushing 18 is of plastic material, such as the polystyrene bushing of the aforesaid Durgmand patent. The outer end of the bushing 18 extends beyond the end of the sheath to provide a satisfactory electrical creepage path from terminal pin to sheath.

The sheath, while in rectilinear form, is subjected to a rolling, swaging or side pressing operation to reduce its cross-section and thereby densify the refractory material 15, and the plastic bushing 18 serves well to contain the refractory material during this operation. The rolling or side pressing operation forces the sheath into sealing contact with the washer 17 and bushing 18, and also forces the latter two sealing contact with the terminal pin 16, since the washer and bushing are also compressed during the rolling or side pressing operation.

After rolling or side pressing, the heating element is frequently plated with tin or the like, and the compressed plastic bushing forms an effective seal to prevent the plating solution from entering the sheath. The heating element, in rectilinear form and with terminals at opposite ends of the sheath, may be used for some heating purposes. However, for installation in a hot water tank the sheath is usually bent to the hairpin formation shown in FIG. 1 and opposite ends extended through openings in the mounting flange 11.

The heating element is usually connected to the flange 11 by a staking operation so as to form circular stake indentations 20 in opposite faces of the flange and surrounding the adjoining ends of the sheath. The stake indentations deform the sheath and bushings, as shown in somewhat exaggerated manner in FIG. 4, to seal the joints between the flange and the two sheath legs. After side pressing of the sheath at the bight 21 to densify any refractory material that might have been loosened by forming the sheath to hairpin formation, the element is ready for assembly with a water tank.

Sometimes in use, the water heating element is overloaded, or fails for some other reason, and this results in a build up of heat and usually fracture of the sheath in the active heating portion which is located within the tank. Heretofore, the abnormal heat would be conducted to the thermoplastic bushing and the latter would melt so that the sheath end would be open and water from the tank could flow through the sheath and outwardly of the then open end of the sheath. This would cause water damage which could be severe if undetected.

However, the foregoing is prevented by my invention since the fibrous washer is resistant to any abnormal heat in the sheath. Since any water tending to flow through the fractured sheath would first meet the fibre washer 17 and since the latter absorbs water, it will swell and thereby make an even tighter seal. Any water pressure applied against the inside surface of the washer, if of sufficient force to tend to move the washer outwardly, will cause the washer to act like a sealed piston, with movement halted when the washer abuts that portion of the sheath which is deformed inwardly by the staking operation.

I claim:

1. In an electric heater for a water tank, said heater having a tubular metal sheath, a portion of which is adapted to be immersed within the water in said tank, a resistance conductor within said sheath, a metal terminal pin having one end within an end of said sheath and electrically connected to an adjoining end of said resistance conductor and having an opposite end extending outwardly of said sheath end for connecting said resistance conductor to a source of electrical energy to create heat, and insulating material within said sheath for electrically insulating resistance conductor and said terminal pin from said sheath and for conducting heat from said resistance conductor to said sheath, said insulating material stopping short of said sheath end to form a pocket thereat, the improvement comprising an improved end seal for said heater, comprising:

a resilient insulating plug within said pocket, the wall of said sheath at said pocket having an inward deformation to lock said plug in position within said pocket and to hold it in sealing engagement with the inner peripheral surface of said sheath and the peripheral surface of said terminal pin, an electrically insulative fibrous member held within said pocket by said insulating plug in position between the latter and that portion of said insulating material forming the bottom of said pocket, said fibrous member spanning the adjacent peripheral space between said terminal pin and the inner surface of said sheath, said fibrous member being resistant to abnormal heat within said sheath and adapted to absorb water which may enter the sheath in the event of fracture of that portion of the latter immersed in the water in said tank, absorption of water causing said fibrous member to swell to sealing engagement with the inner peripheral surface of said sheath and the peripheral surface of said terminal pin, said inward deformation providing a stop to restrict movement of said fibrous member outwardly of said pocket in the event said resilient plug is unlocked from its said position within said pocket, and in the event water pressure applied against said fibrous member is of sufficient force to tend to move the latter in a direction outwardly of said pocket.

2. The construction according to claim 1 wherein said fibrous member is formed of material having excellent arc resistance and good frictional wearing and oil resistance qualities.

3. The construction according to claim 1 wherein said insulating plug is a plastic bushing.

4. The construction according to claim 3 wherein said fibrous member is a washer of vulcanized fibre.

5. The construction according to claim 4 wherein said insulating material is compacted refractory material, and wherein one side of said fibre washer abuts against the bottom of said pocket, and the end of said plastic bushing innermost of said pocket abuts against the opposite side of said washer.

6. The construction according to claim 1 wherein said sheath end extends through an opening in a member for supporting said heater on the wall of said tank, said supporting member having a staking indentation around said sheath end to lock the same to said supporting member and to form said inward deformation of said sheath wall.

7. The construction according to claim 1 wherein said sheath is of the hairpin type providing a pair of side-by-side legs joined by a bight portion, each leg having an end provided with said improved end seal, each leg end extending through a respective opening in a member for supporting said heater on the wall of said tank, said supporting member having a staking indentation around each leg end to lock the same to said supporting member and to form respective inward deformations of said sheath wall.

* * * * *